United States Patent [19]

Arnold

[11] 4,359,127
[45] Nov. 16, 1982

[54] FORKLIFT VEHICLE WITH AUTOMATIC STEERING RETURN

[75] Inventor: William Arnold, Sutton West, Canada

[73] Assignee: Brouwer Turf Equipment Limited, Toronto, Canada

[21] Appl. No.: 154,569

[22] Filed: May 29, 1980

[30] Foreign Application Priority Data

Jun. 21, 1979 [CA] Canada ................................ 330326

[51] Int. Cl.³ .............................................. B62D 5/10
[52] U.S. Cl. .................................. 180/252; 180/132
[58] Field of Search ...................... 180/140, 132, 252

[56] References Cited

U.S. PATENT DOCUMENTS

| | | | |
|---|---|---|---|
| 3,202,238 | 8/1965 | Strader | 180/140 |
| 3,933,215 | 1/1976 | Scheuerle | 180/140 |
| 4,003,447 | 1/1977 | Weyer | 180/140 |
| 4,008,782 | 2/1977 | Chanal | 180/132 |

*Primary Examiner*—John A. Pekar
*Attorney, Agent, or Firm*—Rogers, Bereskin & Parr

[57] ABSTRACT

A self propelled forklift vehicle having a frame formed by two spaced parallel longitudinal frame members and a rear transverse frame member. The fork carriage is movable forwardly and rearwardly on the longitudinal frame members, along the path of the machine, and carries a fork tower and forks. The forks can be forced below the vehicle to raise the vehicle up beneath the rear of a trailer for transport. The vehicle's rear wheels, which steer and drive the vehicle, are closely spaced and tiltable from side to side to allow for rough terrain, with the operator seat and motor on opposite sides thereof to balance each other. A manually operated split pulley drive allows creeping of the vehicle at a closely controlled low speed. The fork tines include erectable rollers to support part of the vehicle weight when the forks carry a forwardly extended load, to prevent tipping. A front gate causes a discharge of the contents of a pallet onto the ground when the fork carriage is retracted. An automatic centering mechanism returns the rear driving wheels to either front driving or rear driving position as selected by the operator.

4 Claims, 13 Drawing Figures

FORKLIFT VEHICLE WITH AUTOMATIC STEERING RETURN

This invention relates to a self propelled forklift vehicle.

Forklift vehicles are commonly used for transporting pallets carrying loads, and for removing the pallets from high surfaces and placing them on lower surfaces or vice versa. Forklift vehicles are normally quite heavy, particularly since they commonly use heavy counterweights to balance the load carried by the forks, and therefore the forklift vehicles cannot easily be transported from one site to another. This is a serious disadvantage in many applications, since forklift vehicles are commonly required for loading and unloading sod, bricks, construction materials and the like at locations where it would be uneconomic to maintain a forklift vehicle present at all times.

Because of the need which has existed for some time for a transportable forklift vehicle, several such vehicles have been developed. One such forklift vehicle is shown in U.S. Pat. No. 3,908,849 to H. F. Carroll. Another such forklift vehicle is shown in U.S. Pat. No. 3,799,399 to T. H. Grether. However the forklift vehicles shown in these patents have various disadvantages. For example, the vehicle shown in the Carroll patent lacks stability under certain conditions and it has inadequate traction in slippery terrain. The forklift vehicle shown in the Grether patent also lacks stability under certain operating conditions and its design has been found to cause difficulties in operation and maintenance.

The co-pending application Ser. No. 154,567 filed May 29, 1980 of G. J. Brouwer and myself describes a self-propelled forklift vehicle which can relatively conveniently be transported from one location to another, and yet which provides improved stability and convenience of operation even when operating over rough terrain such as is commonly found on construction sites. In that application, a forklift vehicle is described having rear wheels mounted on a yoke which rotates through 360 degrees, so that the rear wheels are used to steer as well as to drive the vehicle. It is found that in such an arrangement it is desirable to have a mechanism whereby the operator can return the wheels to a forward driving or rearward driving condition in a simple manner. Accordingly in one aspect the invention provides, in a self-propelled material handling vehicle having a frame, a rear wheel carried by said frame and steerable through 360 degrees for driving and steering said vehicle, a steering member connected to said rear wheel, and motor means for driving said steering member to steer said wheel, an automatic centering means for returning said wheel to a front driving or rear driving position, comprising: cooperating sensing means mounted on said steering member and said frame for sensing the steering condition of said wheel; a steering control having a forward, a reverse and a neutral condition; and control means connected between said motor means, said sensing means and said steering control and responsive to the condition of said sensing means when said steering control is in said forward condition to operate said motor to steer said wheel to a front driving condition, and responsive to the condition of said sensing means when said steering control is in said reverse condition to operate said motor to steer said wheel to a rear driving condition.

Further objects and advantages of the invention will appear from the following description, taken together with the accompanying drawings in which.

Figure 1:
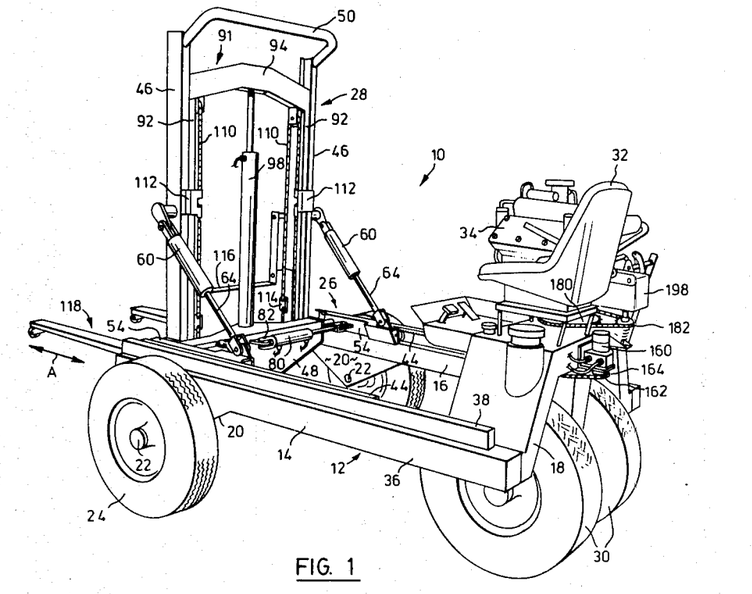
FIG. 1 is a perspective view of a forklift vehicle according to the invention.

Reference is first made to FIG. 1, which shows a preferred form of forklift vehicle 10 with which the invention is used. The forklift vehicle 10 has a frame 12 formed by a pair of elongated, parallel, laterally spaced, longitudinal frame members 14, 16 and a transverse rear frame member 18 which connects the rear ends of the frame members 14, 16. Each frame member 14, 16 has near its front an integral, triangular, downwardly extending plate 20. Axles 22 of front wheels 24 are mounted on and project outwardly from the bottoms of plates 20. Since the front wheels 24 are located on the outside of the frame members 14, 16, this leaves the space between the frame members 14, 16 clear for a fork carriage 26 and fork tower 28. The front wheels 24 are of substantial diameter, to facilitate travel over rough terrain along a forward and rearward path of travel indicated by arrow A, which is parallel with the frame members 14, 16.

The rear of the vehicle 10 is supported by a pair of rear wheels 30 which are centered under the rear transverse frame member 18. The rear wheels 30 also serve to drive and steer the vehicle. The operator controls the vehicle from a seat 32 located to one side of the rear wheels 30, and a gasoline or diesel motor 34 is located over the rear frame member 18 beside the driver's seat, where it will counterbalance the weight of the operator.

Figure 2:
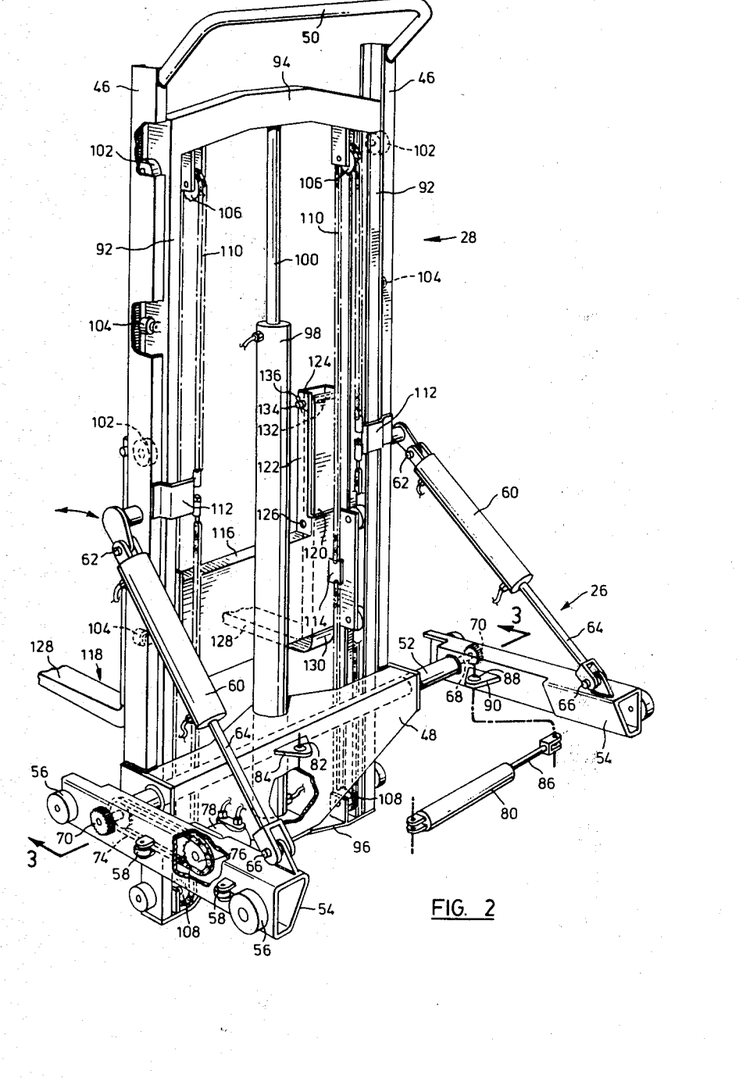
FIG. 2 is a perspective view, partly exploded, showing the fork carriage, tower, mast and forks of the FIG. 1 forklift vehicle.
Figure 3:
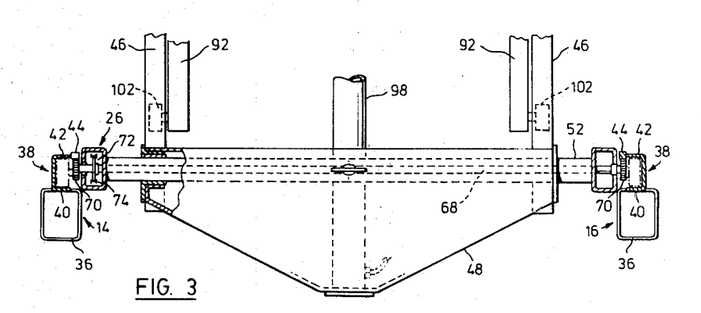
FIG. 3 is a sectional view taken along lines 3—3 of FIG. 2.

The entire fork carriage 26 is movable frontwardly and rearwardly along the frame members 14, 16, and reference is next made to FIGS. 2 and 3 which together with FIG. 1 show the fork carriage 26 and the frame members 14, 16 in more detail.

As best shown in FIG. 3, each frame member 14, 16 includes a box-shaped channel 36 having a U-shaped channel 38 located thereabove. The U-shaped channels 38 are oriented on their sides and face inwardly towards each other. The lower leg 40 of each U-shaped channel 38 forms an integral portion of the box-shaped channel 36, being welded to fill the gap which would otherwise be present in the box-shaped channel 38. This avoids overlap of material and helps to lighten the forklift vehicle to reduce the load which must be transported when the forklift vehicle is being carried from one site to another. The upper leg 42 of the U-shaped channel 38 carries at its tip a longitudinally extending rack 44.

The fork tower 28 includes (FIG. 2) a pair of vertically oriented, laterally spaced channels 46 which face inwardly towards each other and which are welded to a base 48. The tops of the channels 46 are connected by a U-shaped tube 50 which holds them in proper spaced relation.

The base 48 of the fork tower 28 is pivotally and slidably mounted on a transverse tube 52, by rollers (not shown). Each end of the tube 52 is welded to a longitudinally extending hollow carriage side member 54. The outer side surfaces of the side members 54 carry wheels 56 which fit snugly within and roll within the U-shaped channels 38 (FIG. 3) to carry the weight of the fork carriage. Side thrust rollers 58 (FIG. 2) are also carried by the carriage side members 54, to act as side thrust bearings.

Since the fork tower base 48 is pivotally mounted on tube 52, the fork tower 28 can tilt in an arc extending forwardly and rearwardly. The forward and rearward tilting is controlled by a pair of cylinders 60. The butt end of each cylinder 60 is pivotally connected by a ball joint 62 to its associated upright channel 46 of the fork tower, and the rod 64 of the piston in each cylinder is pivotally connected by another ball joint 66 to its associated carriage side member 54. Extension and retraction of the piston rods 64 will tilt the tower 28 forwardly and rearwardly.

The fork carriage 26 is propelled forwardly and rearwardly along the frame members 14, 16 as follows. A transverse shaft 68 (FIGS. 2, 3) extends through the tube 52 and carries a drive gear 70 at each end thereof. The drive gears 70 (FIG. 3) engage the teeth of the rack 44 on each frame member. Inside one of the hollow carriage side members 54, the shaft 68 carries a sprocket 72 which is connected by a drive chain 74 to a second sprocket 76. The sprocket 76 is mounted on the shaft of a hydraulic motor 78 secured to the carriage side member 54. When the hydraulic motor 78 is operated, its sprocket 76 drives the gears 70 through the chain 76 and sprockets 72, 76, thus moving the fork carriage forwardly or rearwardly as desired. Since the sprockets 72, 76 and the chain 74 are located entirely within the enclosure of the carriage side member 54, they are relatively well protected from the dirt, mud and stones which inevitably are present at construction sites. In addition, since the teeth of the racks 44 face downwardly, dirt and stones are unlikely to become wedged therein to interfere with the movement of the fork carriage 26.

To permit sideways adjustment of the fork tower 28 without sideways movement of the vehicle, a sideways movement cylinder 80 is pivotally connected at 82 to a mount 84 on the fork tower base 48. The rod 86 of the piston in cylinder 80 is pivotally connected at 88 to a mount 90 on the fork carriage side frame member 54.

The mast 91 of the fork tower 26 is conventional and includes a pair of side channels 92 connected together by top and bottom cross members 94, 96 respectively. The mast 91 is raised and lowered by a conventional vertically oriented cylinder 98 secured to the base 48 and having a piston rod 100 extending upwardly and secured to the top cross member 94. The outwardly opposed surfaces of channels 92 of the mast carry sets of rollers 102, 104 to guide the mast in the tower channels 46 as the mast moves up and down.

At each side thereof the mast 91 carries upper sprockets 106 and lower sprockets 108. Chains 110 extend around these sprockets and are secured to brackets 112 welded to the outer tower frame channels 46. At their front runs the chains 110 are secured to blocks 114 which in turn are connected to the rear of a fork holder 116. Two forwardly facing forks generally indicated at 118 are connected to the fork holder 116 in a manner to be described.

It will be seen that as the piston rod 100 of the tower cylinder 98 is extended, the forks 118 will rise in conventional manner at twice the rate of such extension. Similarly as the piston rod 100 is retracted, the forks 118 will be lowered at twice the rate of the retraction.

As best shown in FIG. 2, the fork holder 116 includes a pair of pockets 120, one at each side thereof (only one such pocket is visible in FIG. 2). Each pocket 120 is formed in part by an upward channel-shaped extension 122 from each side of the fork holder 116. Each upward extension 122 has upper and lower transverse holes 124, 126 extending therethrough.

The forks 118 are L-shaped, each having a forwardly extending tine 128 and an upwardly extending back piece 130. Each back piece 130 has a transverse hole 132 therethrough so that the fork may be hung from the fork holder 116 by pins 134 which extend through the holes 132 in the fork back piece and through holes 124 or 126 in the fork holders extensions. The pins 134 are held in place by hairpin retainers 136.

Figures 4, 5:
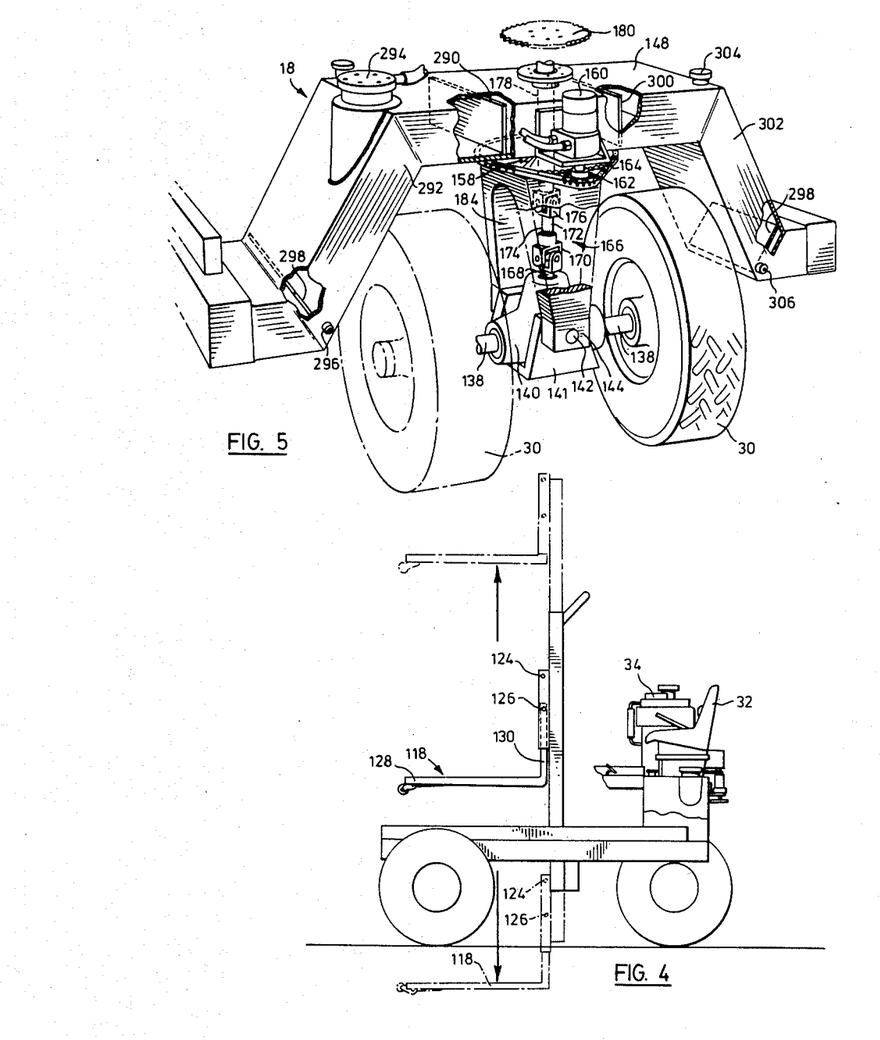
FIG. 4 is a side view showing various fork positions for the vehicle of FIG. 1.
FIG. 5 is a perspective rear view, partly exploded, of the rear frame portion, rear wheels and rear drive arrangement of the FIG. 1 vehicle.

The arrangement described for mounting the forks 118 permits two fork positions, namely an upper position shown in FIG. 2 in which the forks 118 can be raised to the maximum extent, and the lower position shown at the bottom of FIG. 4. To move the forks to the lower position the pins 134 are removed, each fork is moved to its lower position, and the pins 134 are then reinserted through holes 132, 126 to secure the forks in their lower position. When the forks 118 are in their lower position, retraction of the piston rod 100 of the fork tower will drive the forks to a position substantially below the bottom of the wheels of the vehicle, as shown in FIG. 4. This permits the vehicle to be raised so that it can be locked to the underside of a trailer, as will be explained.

Figure 6:
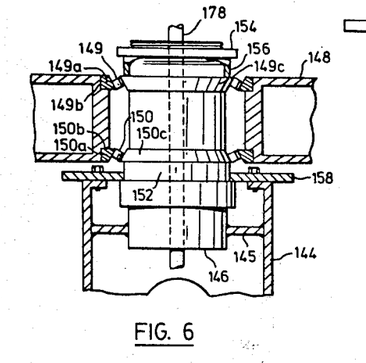
FIG. 6 is a partly sectional view showing the mounting of a yoke shown in FIG. 5.
Figure 6A:
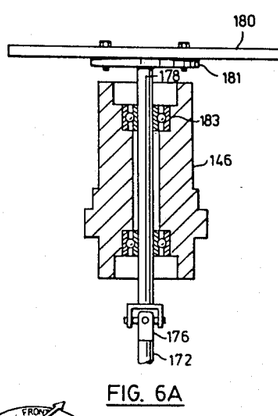
FIG. 6a is a sectional view of a metal tube shown in FIG. 6.

Reference is next made to FIGS. 5, 6 and 6A, which show the mounting for the rear wheels 30. As shown, the rear wheels 30 are relatively closely spaced, being mounted on short axles 138 which extend outwardly from opposite sides of a differential unit 140. The differential unit 140 is secured to a U-shaped holder 141 which is pivotally mounted, by pivot shaft 142, within a yoke 144. The axis of pivot shaft 142 is horizontal and oriented at right angles to that of axles 138, permitting side to side tilting of the rear wheels 30.

The yoke 144 has a cross plate 145 (FIG. 6) welded across its upper portion. A large diameter metal tube 146 is welded to cross plate 145 and from the center of cross plate 145, and then extends upwardly through the center horizontal raised portion 148 of transverse frame member 18. The tube 146 is secured to the transverse frame member center portion 148 by upper and lower tapered roller bearings 149, 150. The upper bearing 149 has a cup 149a set in an upper recess 149b in the transverse frame member portion 148 and a race 149c pressed onto the tube 146. The lower bearing 150 has a cup 150a set in a lower recess 150b in the portion 148 and a race 150c supported on a collar 152 formed on tube 146 by machining. This arrangement supports the weight of the rear of the vehicle on the tube 146, and hence on the rear wheels 30. The top of the tube 146 is threaded and a ring nut 154 is mounted thereon with a collar 156 extending between ring nut 151 and race 149C. Thus when the vehicle is raised, the weight of the yoke 144 and its associated mechanism will be supported from the ring nut.

Steering is achieved by a large sprocket 158 bolted to the top of the yoke 144 beneath the transverse frame member center portion 148. A hydraulic steering motor 160 is provided having a sprocket 162 connected by a chain 164 to the large sprocket 160. Operation of the hydraulic motor 160 will rotate the sprockets 162, 158 to rotate the yoke 144 through 360° in a horizontal plane, to allow steering of the vehicle in any direction.

Figure 7:
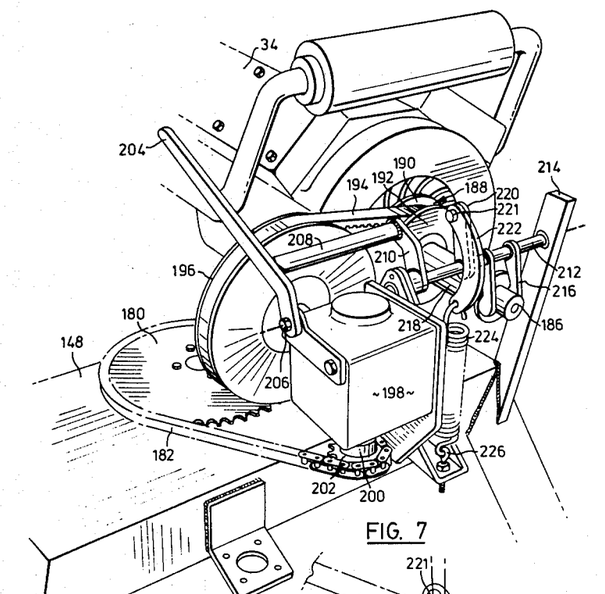
FIG. 7 is a rear perspective view showing the clutch and gear box arrangement for driving the rear wheels of the forklift vehicle.

Drive to the rear wheels 30 is provided via drive shaft means generally indicated at 166 (FIG. 5). The drive shaft means 166 includes a lower drive shaft 168, a lower universal joint 170, an intermediate drive shaft 172 telescopically fitted into the lower universal joint 170 by splines 174, an upper universal joint 176, and an upper drive shaft 178. A sprocket 180 is secured to a plate 181 (FIG. 6A) at the top of the upper drive shaft 178 to receive drive from a drive chain 182 (FIG. 7). The upper portion of the upper drive shaft 178 is supported within the tube 146 by bearings 183 (FIG. 6A) located within the tube 146.

The drive shaft arrangement shown, with the universal joints 170, 176 and telescopic center portion, allows substantial tilting of the rear wheels from side to side without affecting the stability or equilibrium of the vehicle. For example, one rear wheel may be located on a substantial bump while the other rear wheel may be located in a dip, but if the front wheels are level, the vehicle itself will remain level. The large opening 184 in the yoke 144 permits the univeral joint 170 to move sideways as required when the wheels tilt and when the drive shaft assumes a bent configuration, and also provides space for the differential unit 140 and to holder 141 to tilt. The upper universal joint 176 reduces the sideways movement of the bottom of the upper drive shaft 178 and therefore allows use of a smaller diameter yoke support tube 146.

The manner in which the speed of the vehicle is controlled will next be described. As shown in FIG. 7, the motor 34 has a drive shaft 186 extending therefrom. A split pulley 188 has one half 190 fixedly mounted on the drive shaft 186 by splines and a conventional set screw (not shown). The other half 192 of the split pulley 188 is splined onto the shaft 186 but is free to move along the shaft in the direction of the axis of shaft 186. A belt 194 extends around split pulley 188 and around a larger pulley 196 which in turn is connected to a right angle gear box 198. A drive shaft 200 extends from the bottom of gear box 198 and carries a small sprocket 202 which is connected by the chain 182 to the sprocket 180 at the top of the upper drive shaft 178. Thus, when the movable half 192 of split pulley 188 is pushed inwardly towards the fixed half 190 to raise the belt 194 on the pulley sufficiently to tension the belt, power is transmitted from the motor to the rear wheels 30.

Movement of the split pulley half 192 is controlled by a clutch lever 204. The lever 204 is pivotally mounted at 206 on the gear box 198 and carries, spaced above pivot point 206, a rod 208 which projects laterally from lever 204. The rod 208 is welded to a lever arm 210 which is in turn welded to a clutch rod 212. The clutch rod 212 is pivotally mounted between the gear box 198 and a support strut 214. A pair of fingers 216 are welded to the clutch rod 212 and extend downwardly to contact the outer face of a bushing 218 which is rotatably mounted on drive shaft 186. The inner end of bushing 218 contains a ball bearing race (not shown) which presses against the outer surface of the split pulley half 192.

The clutch lever 204 is normally biased so that the clutch is disengaged. Bias is provided by a lever arm 220 having its inner end welded to clutch rod 212 and its outer end pivotally connected at 221 to a curved arm 222. The bottom of the curved arm 222 is biased downwardly by a heavy coil spring 224. The bottom of the coil spring 224 is connected to an eye bolt 226 connected to the upper transverse frame portion 148. The vertical position of eye bolt 226 is adjustable to control the tension of spring 224 and hence the clutch bias force.

In operation of the clutch mechanism, when the clutch lever 204 is moved clockwise as drawn in FIG. 7, the fingers 216 are also rotated clockwise to push the bushing 218 inwardly on the shaft 186. This tensions the belt 194 and produces drive to the rear wheels 30. The speed of the motor can be left constant at this time, and a very low speed creeping drive can be achieved, the rate of which is closely controllable by movement of the clutch lever 204. Such very low speed closely controllable creeping drive is extremely advantageous when loading and unloading on rough terrain when very small movements are required to adjust the position of the forklift vehicle.

Figure 8:
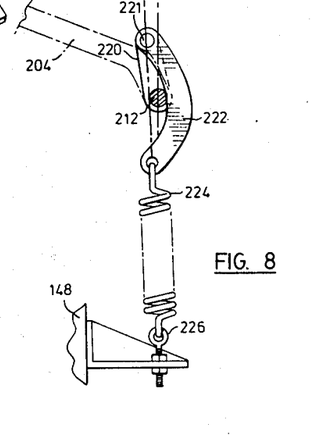
FIG. 8 is a side view of the clutch bias linkage of FIG. 7.

As described and as will be apparent from FIG. 8, the clutch lever 204 is normally biased counterclockwise to a disengaged position by spring 224. However, when the clutch lever 204 is rotated clockwise sufficiently to carry the pivotal connection 221 of arms 220, 222 to the right past the axis of the clutch rod 212, then the spring 224 biases the clutch into engaged condition, thus assisting the operator in controlling the low speed creeping of the vehicle. The bias linkage described thus is an over-the-center linkage.

Figure 8A:
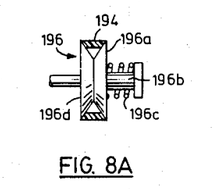
FIG. 8a is a side view of a split pulley of FIG. 7.

Pulley 196A is also a split pulley, as shown in FIG. 8A, where pulley half 196 is shown as being splined on and biased along shaft 196B by spring 196C toward pulley half 196D. Thus, as the effective diameter of pulley 188 increases, that of pulley 196 decreases (since the pressure of the belt forces pulley halves 196A, 196D apart), thus changing the drive ratio and increasing the speed of travel of the machine as the clutch is further engaged.

Figures 9, 10, 11:
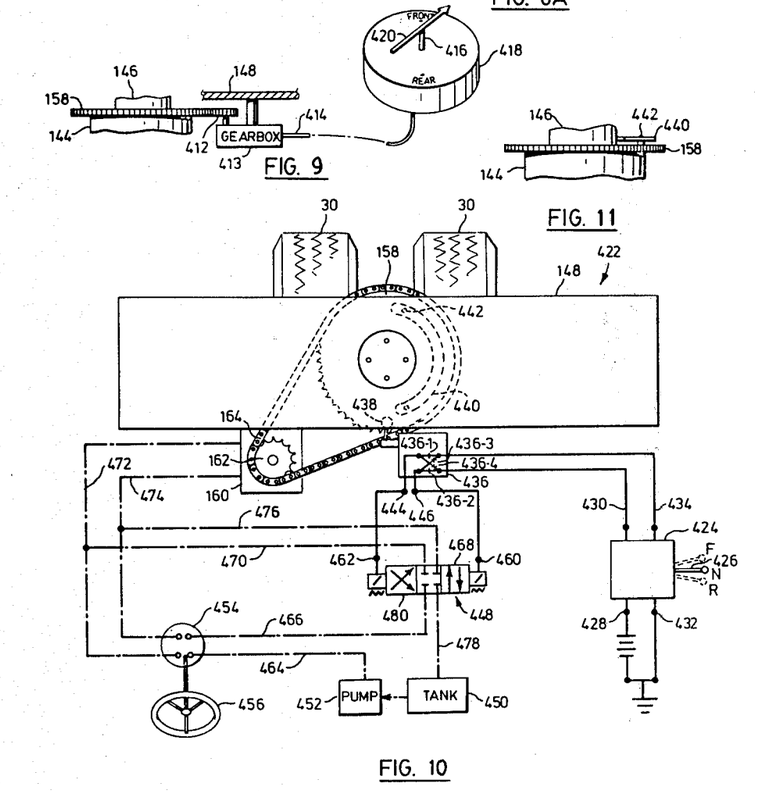
FIG. 9 is a partly perspective view showing an indicator for showing the position of the rear wheels of the forklift vehicle.
FIG. 10 is a plan view showing hydraulic and electric circuits for an automatic rear wheel centering mechanism according to the invention.
FIG. 11 is a side view showing a cam of FIG. 10.

Reference is next made to FIGS. 9 to 11, which illustrate two forms of a centering system for the rear driving and steering wheels 30 of the forklift vehicle. As previously described, the forklift vehicle is both driven and steered by the rear wheels 30, and while this has substantial advantages, it can also cause certain difficulties. Firstly, the operator may not know, even when the wheels are oriented front and aft, whether they are in a position so that the vehicle will drive forwardly or rearwardly when he engages the clutch. This difficulty can also be dealt with by permitting the rear driving wheels 30 to rotate only through 180°, and providing a transmission which permits forward and reverse drive to the wheels. However such a transmission would add additional weight and cost to the vehicle. Secondly, the operator may not always know whether the wheels 30 are in fact pointed directly forwardly.

Both of the above difficulties can be dealt with by connecting a mechanical indicator to the steering sprocket 158. Such an arrangement is shown in FIG. 9, where a gear 412 is shown connected to sprocket 158 and to a gear box 413. The gear box 413 is mounted on the frame portion 148 and the gears in gear box 413 are selected so that the output of the gear box, transmitted by a speedometer cable 414, is exactly matched to the turns of steering sprocket 158. In other words, one 360° turn of steering sprocket 158 will produce one 360° turn of cable 414. Cable 414 is connected to the shaft 416 of a dial indicator diagrammatically indicated at 418. Since one turn of needle 420 corresponds exactly to one turn of steering sprocket 158, the dial indicator (which is located beside the operator's seat 32) can be labelled "front" and "rear" to inform the operator both of the orientation of the rear wheels 30 and the direction in which they will drive.

Alternatively, and according to the invention, an automatic centering system can be provided, so that when the operator pushes a lever, the rear wheels 30 will automatically return, via the shortest distance, to a centered position in which they will drive the vehicle either forwardly or rearwardly as selected by the operator. Such a system is shown at 422 in FIG. 10, where chain dotted lines indicate hydraulic lines and solid lines indicate electrical lines.

The centering system 422 includes an operator controlled switchbox 424 having a lever 426 spring biased to a neutral position N and which may be moved by the operator to a forward position F or a reverse position R. In its forward position F the lever 426 connects battery terminal 428 to wire 430 and ground terminal 432 to a second wire 434, while in its reverse position R the lever 426 reverses these connections. In its neutral condition N the lever opens the connections between wires 430, 435 and terminals 428, 432.

The wires 430, 434 extend to a double-pole double-throw limit switch 436. The switch 436 has four contacts, namely two normally open contacts 436-1, 436-2, and two normally closed contacts 436-3, 436-4. These contacts are indicated in detached contact notation in FIG. 10, normally open contacts being indicated by an x and normally closed contacts being indicated by a dash.

The limit switch 436, which can be a standard microswitch, has a cam follower 438 which rides on the outside surface of a semi-circular cam 440 mounted by two bolts 442 on the upper surface of the steering sprocket 158 (see also FIG. 11). When the cam follower 438 is on the cam 440, the limit switch 436 operates closing the normally open contacts 436-1, 436-2 and opening the normally closed contacts 436-3, 436-4.

The output terminals 444, 446 of the limit switch 436 are connected to opposite ends of a solenoid four way directional valve 448 which is connected into the power steering circuit for the forklift machine.

The power steering circuit for the forklift machine is standard, except for the directional valve 448, and includes a tank 450, and a pump 452 which supplies fluid to a conventional power steering valve 454 such as that sold under the trade mark "Orbitrol". The hydraulic hoses from the steering valve 454 extend in conventional manner to the hydraulic steering motor 160 and to the pump 452 and tank 450, so that the operation of the steering wheel 456 attached to the steering valve 454 will in conventional manner operate the steering motor 160 in the direction governed by the steering wheel 456.

The four way directional valve 448 is arranged as shown so that it will override the steering valve 456 and will operate the steering motor 160 directly when valve 448 is energized. Operation is as follows.

Normally the four way valve 448 is spring biased to its centre position, where it has no effect on the operation of motor 160. If now the lever 426 is moved to the forward position, this energizes the solenoid valve 448 to operate the hydraulic steering motor 160. The direction in which valve 448 and hence the motor 160 operates will depend on the condition of the limit switch 436. Assume that in the position drawn in FIG. 32, the wheels 30 will drive the vehicle forwardly, and assume further that the fronts of wheels 30 have then been shifted 90° counterclockwise from the position drawn, so that cam follower 438 is off the cam 440. Then, with lever 426 in position F, battery is connected from terminal 428 through wire 430, through contact 436-2, and through terminal 446 to terminal 460 of solenoid valve 448. Ground is similarly connected to terminal 462 of valve 448. This shifts the valve spool to the right as drawn. Hydraulic fluid then flows through hose 464, through the steering valve 454 (which is in centered position, allowing fluid to circulate freely therethrough), through hose 466, through valve spool portion 468, and through hoses 470, 472 to motor 160. The return path is through hoses 474, 476, valve spool system 468, and hose 478 to the tank 450. This drives hydraulic motor 160 and sprocket 158 clockwise to return the wheels 30 to centered and forward drive condition via the shortest route. Had the fronts of wheels 30 been shifted to the right, i.e. clockwise, from the position drawn, then cam follower 438 would have been on cam 440, reversing the polarity of the connections to valve 448. Hydraulic fluid would then have flowed through valve spool portion 480, reversing the flow of fluid to hydraulic motor 160 and rotating sprocket 158 counterclockwise, again returning the wheels 30 to centered and front driving condition via the shortest path.

When the wheels 30 are rotating (for example) clockwise toward centered position as described above, cam follower 438 is off cam 440. When the wheels 30 reach and pass centered position, cam follower 438 moves onto cam 440, reversing the connections in limit switch 436 and hence reversing the condition of the valve spool of valve 448. This reverses the steering motor 160 and the wheels 30 now begin to rotate counterclockwise. The result is that the wheels 30 then oscillate back and forth slightly as the cam follower 438 comes on and off the cam 440. The oscillation tells the operator that the center position has been reached and he releases the centering lever 426 which then returns to position N, terminating operation of the steering motor 160.

If the operator desires the wheels to be centered and to drive the vehicle rearwardly, then he moves the centering lever 426 to the position R, reversing the polarity of electrical feed to the limit switch 436. This reverses the entire operation so that the wheels 30 now rotate to a position in which they will drive the vehicle rearwardly when drive is applied to the wheels 30.

When the centering lever 426 is returned to neutral position, the four way directional valve 448 returns under spring bias to its center position as drawn, blocking fluid flow through hoses 470, 476.

It will be seen that whatever the position of the wheels 30, they will always turn 180° or less to the position selected by the operator, and will never be required to turn more than 180° to the selected position.

Although two rear driving and steering wheels have been shown, it will be appreciated that only one wheel may be used if desired, substantially preferably centered under the rear frame member.

It will be appreciated that various features of the invention, for example the clutch mechanism for permitting low speed creeping, may be used in material handling vehicles other than forklift vehicles.

It will also be appreciated that the fork carriage may be driven by means other than the rack system shown. For example it may be operated by a roller or belt drive, or by a hydraulic cylinder. However, the rack and hydraulic motor system is preferred because of its positive drive, long stroke and low weight and cost.

If desired, the vehicle drive may be electrical rather than gasoline or diesel. In addition, the drive shaft means 166 (FIG. 5) may be eliminated and replaced by a hydraulic motor located in the place of the differential 140. In addition, ordinary automobile-type steering may be used in that event. However the yoke 144 will still preferably be used, so that the space 184 therein will permit side to side tilting of the rear wheels.

What I claim as my invention is:

1. In a vehicle having a frame, a wheel mounted on said frame, means for driving said wheel to propel said vehicle, and motor means for selectively driving said wheel through a 360 degree steering arc, the improvement comprising an automatic centering means for returning said wheel to a front steering position in which said vehicle is driven straight forwardly or a rear steering position in which said vehicle is driven straight rearwardly, said centering means comprising: means for sensing the actual steering position of said wheel relative to said frame; manually controlled actuating means having a forward, a reverse, and a neutral condition; and means for controlling said motor means to automatically drive said wheel toward said front steering position only in response to said actuating means being in said forward condition and said sensing means indicating that said wheel is not in said front steering position, and to automatically drive said wheel toward said rear steering position only in response to said actuating means being in said reverse condition and said sensing means indicating that said wheel is not in said rear steering position.

2. Apparatus according to claim 1 wherein said centering means includes a steering sprocket connected between said motor means and said wheel so that one turn of said steering sprocket corresponds to one steering turn of said wheel, and said means for sensing comprises cam means mounted on said steering sprocket and extending around approximately 180 degrees of arc, and cam follower means mounted on said frame and engageable with said cam means.

3. Apparatus according to claim 2 wherein said cam means is a semi-annular plate.

4. Apparatus according to claim 2 wherein said motor means is a hydraulic motor, said vehicle including a source of hydraulic pressure fluid and a first fluid circuit including a steering valve, connected between said source and said hydraulic motor for power steering said vehicle, said means for controlling said motor means including a four way solenoid valve having a neutral condition and first and second operated conditions, a second fluid circuit connected through said four way valve between said source and said hydraulic motor so that operation of said valve to said first operated condition will drive said hydraulic motor in one direction and operation of said valve to said second operated condition will drive said hydraulic motor in the other direction, a source of electrical energy, said actuating means being connected to said source of electrical energy and having a pair of output terminals, said actuating means having a switch therein operable when said actuating means is in said forward condition for connecting said source of electrical energy to one of said terminals and for connecting said source of electrical energy to the other output terminal when said actuating means is in said reverse condition, and switch means connected between said output terminals and said solenoid valve, said switch means being coupled to said cam follower means and responsive to the condition thereof for operating said solenoid valve to said first operated condition when said cam follower means engages said cam means when a selected output terminal is energized and also when said cam follower means is disengaged from said cam means and the other output terminal is energized, and for operating said solenoid valve to said second operated condition when said cam follower means is disengaged from said cam means and said selected output terminal is energized and also when said cam follower means engages said cam means and said other output terminal is energized.

* * * * *